June 8, 1965  R. W. WATERFILL  3,187,768
FLOW CONTROL

Filed Aug. 11, 1960  3 Sheets-Sheet 1

INVENTOR.
ROBERT W. WATERFILL
BY
*Robertson & Smythe*
ATTORNEYS

June 8, 1965

R. W. WATERFILL 3,187,768

FLOW CONTROL

Filed Aug. 11, 1960

INVENTOR.
ROBERT W. WATERFILL

BY

ATTORNEYS 3,187,768
FLOW CONTROL
Robert W. Waterfill, Montclair, N.J., assignor to Buensod-Stacey Corporation, New York, N.Y., a corporation of Ohio
Filed Aug. 11, 1960, Ser. No. 49,080
6 Claims. (Cl. 137—514)

The present invention relates to fluid flow control devices and particularly to an arrangement for maintaining a desired flow pattern, regardless of upstream pressure changes, by employing a smoothly acting swingable-type damper while avoiding flutter and slamming thereof.

The principal object of this invention is to provide a swingable-type damper that is responsive to, and powered by, upstream pressure for maintaining a predetermined flow pattern.

Another object of the invention is to provide such a fluid control device including a swingable damper that is smooth in action, and which avoids fluttering and slamming.

Another object of this invention is to provide such a fluid control device including a swingable damper provided with unbalanced force producing means which latter varies in response to variations in upstream pressure changes.

Another object of this invention is to provide such a fluid control device including a swingable damper that is moved toward a closed position by the upstream pressure, while the rate of closing is controlled by varying the forces acting on the damper on each side of its pivot.

Another object of this invention is to provide such a fluid control device including a swingable damper in which an unbalanced area arrangement of the damper diminishes as the upstream pressure increases, to thereby temper the thrust as the damper swings toward a closed position.

Another object of this invention is to provide a swingable type of damper in which the pivot point automatically shifts in response to upstream pressure variations to produce degrees of effective damper area variation on each side of the pivot.

Another object of the invention is to provide a swingable damper pivoted in a manner such that the force moment incident to fluid flow past the damper and acting to open the damper diminishes more rapidly than that acting to close it when the damper is moved from a closed position toward an open position, and vice versa.

In one aspect of the invention, a stationary rack may be mounted on the outside of a fluid flow duct in position to mesh with a pinion fixed to a rotatable shaft journaled in slots for permitting movement of the shaft as the pinion rolls on the stationary rack. The damper may be fixed to the periphery of a member within the duct and rotatable with, and about the axis of rotation of the pinion. Since the point on the member where the damper is fixed moves along a cycloidal path while the instantaneous center of the pinion moves along the straight line of the rack, the effective area of the damper above the pivot increases while that below the pivot decreases when the damper is opened. Resilient means may be provided for maintaining the damper blade open an amount to provide a predetermined fluid flow through it. Variations in the pressure differential between the upstream and downstream sides of the damper automatically position the damper to maintain a substantially constant flow of fluid past the damper. As the upstream pressure increases, the differential area for each position incident to a different upstream pressure diminishes, thereby providing a control on the damper movement as it moves toward a closed position, preventing flutter and slamming shut of the damper.

In another aspect of the invention, the damper may be arranged with a fixed effective area differential between the two sides of its pivot point, and resilient means may be provided to normally maintain the damper blade in a position to provide a predetermined flow of air through the damper. In order to prevent slamming shut of the damper when the upstream pressure rises, a pocket may be provided of flexible material mounted on the damper. This pocket may extend downstream beyond the damper, and an adjustable stop may be provided slightly downstream from the closed position of the damper so as to progressively engage the flexible material of the pocket as the damper closes, thereby absorbing the thrust caused by the increased upstream fluid pressure.

In still another aspect of the invention, the damper may be arranged with the same or a different effective area on each side of the pivot point, and the lower side of the blade may be provided with slots therein for permitting free flow of fluid therethrough, thereby in effect producing a lesser effective damper area below the pivot point than above it. Progressively spaced, radial vanes may be provided in the path of movement of the lower portion of the damper and they may be so arranged that the fluid flow and/or resilient means maintain them in their spaced locations. As the damper moves toward a closed position, the vanes successively block the slots in the lower portion of the damper, thereby diminishing the differential effective area on both sides of the pivot and preventing flutter or slamming of the damper.

In another aspect of the invention, the damper may be mounted on a pivot shaft spaced upstream from the plane of the damper when in closed position. An arm may be fixed to the pivot shaft exteriorly of the duct in a manner to form a bell crank with the spacing means supporting the damper. The free end of the bell crank arm may be connected to a spring anchored to the outside of the duct containing the damper. Since the pivot shaft of the damper is spaced upstream from the plane of the damper when closed, during the pivoting of the damper about this shaft in opening, the force moment incident to the fluid flow past the damper tending to open it decreases more rapidly than that tending to close it. Conversely, movement of the damper toward a closed position causes a more rapid increase in the force moment tending to resist said closing than that tending to effect said closing. Accordingly, the force moments tend to balance each other when the damper moves toward its closed position.

In still another aspect of the invention, a damper within an air duct may include a portion on one side of its pivot extending to the duct wall and the other side shortened, with a flexible curtain means having its one end connected to the end of the shorter end of the damper, and its other end connected to the wall of the duct. A curtain limiting means which may be fixed or adjustable may be located adjacent the connection between the duct and curtain, with which the curtain may cooperate to vary its effectiveness in applying a closing force to the damper. The construction and arrangement may be such that a spring means normally maintains the damper open sufficiently to permit a predetermined air flow past the damper. Should the air flow increase, the force applied to the damper tending to close it diminishes as the damper nears its closed position.

The above as well as other objects and novel features of the invention will become apparent from the following specification and accompanying drawings which are merely exemplary.

Figure 2:
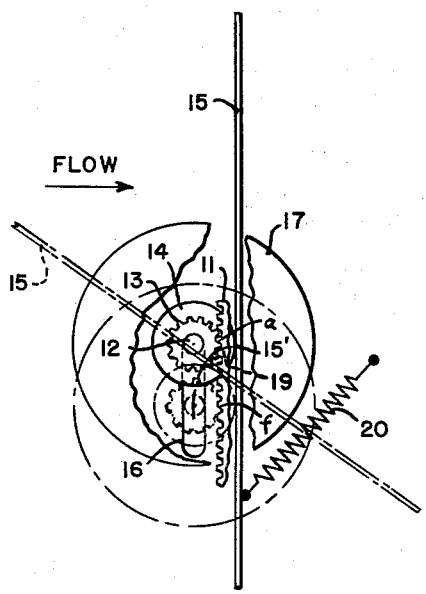
FIG. 2 is an enlarged view taken along line 2—2 of FIG. 1.
Figure 1:
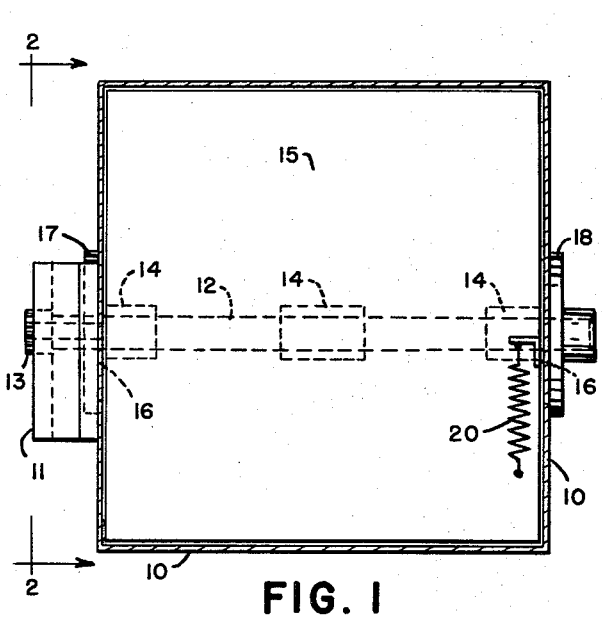
FIG. 1 is a cross-sectional view of a duct including a damper to which the principles of the invention have been applied.

Referring to the embodiment of FIGS. 1 and 2, the principles of the invention are shown as applied to a flow control device including a duct 10, to the outside of which is fixed a rack 11. A pivot shaft 12 has fixed to it a pinion 13 that meshes with the rack 11 and which shaft 12 extends transversely across the duct 10 to the outside opposite the location of the rack 11.

Bosses 14 are fixed to the shaft 12 within duct 10, and a damper 15 may be fixed to a point 15' on the periphery of the bosses 14. As will appear hereinafter, the larger the diameter of the bosses 14, the greater will be the differential effective area of the damper 15 on opposite sides of the pivot shaft 12 as the damper pivots between a closed and open position.

If the pinion 13, fixed to shaft 12, is to roll on the stationary rack 11, vertical slots 16 may be provided within the side walls of the duct 10 to accommodate such rolling. These slots would exhaust fluid within duct 10 unless provision is made to prevent it. Accordingly, discs 17 and 18 may be fixed to shaft 12 on the outside of duct 10, said discs being of such diameter that they overlap and provide fluid seals for the slots 16 in all vertical positions of shaft 12 as the pinion 13 rolls on the stationary rack 11. Of course, housings may be provided to completely encase the rack 11, pinion 13 and the opposite end of shaft 12 throughout the movement of shaft 12 as pinion 13 rolls along rack 11.

Referring to FIG. 2 which is enlarged in order to better disclose the action of the parts, as the pinion 13 rolls downwardly on the rack 11, the point 15' follows a cycloidal path 19, but the effective pivot point of damper 15 follows the instantaneous centers *a* to *f* (only "*a*" and "*f*" being shown) of the pinion 13 on the rack 11. Accordingly, it is apparent that as the damper 15 moves counterclockwise from a closed vertical position, the effective area above the instantaneous effective pivot point (*a-f*) increases while the effective area below said effective pivot point decreases. Furthermore, in the clockwise movement of damper 15 from an open position toward a closed position, the effective area above the instantaneous pivot axis decreases while that below said axis increases.

From the foregoing it is evident that with fluid flow in the direction of the arrow in FIG. 2, the damper 15 tends to remain closed. Accordingly, a spring or weight device 20 may be employed normally maintaining damper 15 in a position where a predetermined flow of fluid past the damper 15 will occur. Decreasing upstream fluid pressure will automatically cause the damper 15 to open more by spring 20, and the effective area below the instantaneous pivot axis (*a-f*) will decrease while that above said axis will increase, tending to provide greater resistance to said opening.

On the other hand, increasing upstream pressure will act on the larger effective area above the pivot axis (*a-f*) tending to close the damper 15 against the action of spring 20 but this will be accompanied by the decreasing effective area of damper 15 above said pivot axis and the increasing effective area of the damper 15 below said axis. This action progressively increases the resistance against closing the damper 15 and hence provides a unique automatic pressure area balance means preventing an erratic action of damper 15 as well as preventing said damper from slamming shut when excessive increases in upstream pressure occur.

Figure 4:
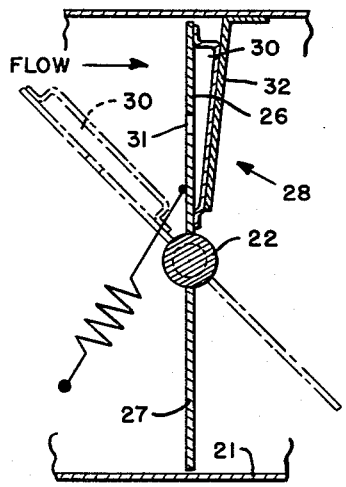
FIG. 4 is a sectional view taken substantially along line 4—4 of FIG. 3.
Figure 3:
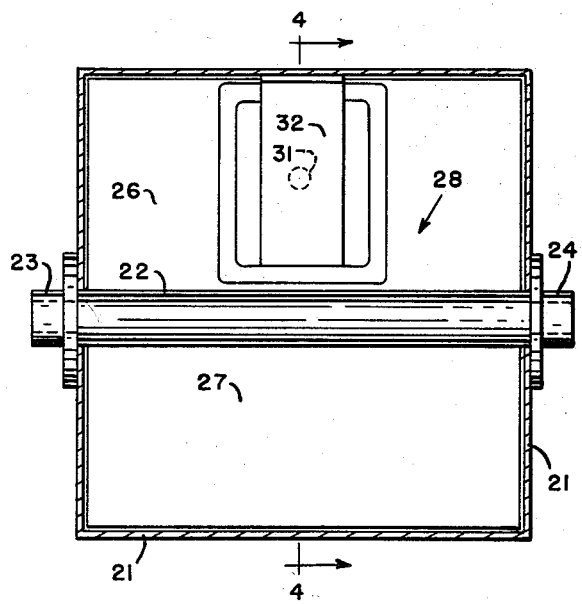
FIG. 3 is a cross-sectional view of a duct including a damper to which a modified form of the principles of the invention has been applied.

Referring to the embodiment of FIGS. 3 and 4, the principles of the invention are shown as applied to a duct 21 having a pivot shaft 22 extending transversely there-across and journaled in bearings 23 and 24 having flanges fixed to the outer side walls of the duct 21. Upper and lower portions 26 and 27 of a damper 28 may extend radially from the shaft 22. The amount by which the upper portion 26 extends radially from shaft 22 may be greater than that of the portion 27 in order to provide an unbalanced effective area arrangement tending to move the damper 28 in a clockwise direction (FIG. 4) with the fluid flow as indicated by the arrow therein.

A spring 29 or other biasing means may be employed to maintain the damper 28 in a position to pass a predetermined flow of fluid which may be designed to provide a predetermined balance of forces between that due to the effective area differential between portions 26 and 27 and that of spring 29. A flexible pocket member 30 may be fixed to the downstream side of the portion 26, and an opening 31 may be provided in portion 26 permitting the flexible member 30 to be filled with fluid. A stop means 32 may be adjustably fixed within the duct 21 downstream of the closed position of the upper portion 26 in a manner to cooperate with the blown-up flexible member 30 to intercept its movement and cushion the closing action of the damper 28 by forcing the air from within the flexible member outwardly through the orifice 31.

Figure 6:
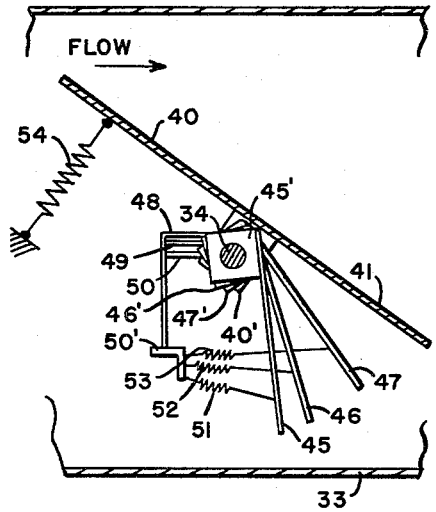
FIG. 6 is a sectional view taken substantially along line 6—6 of FIG. 5.
Figure 5:
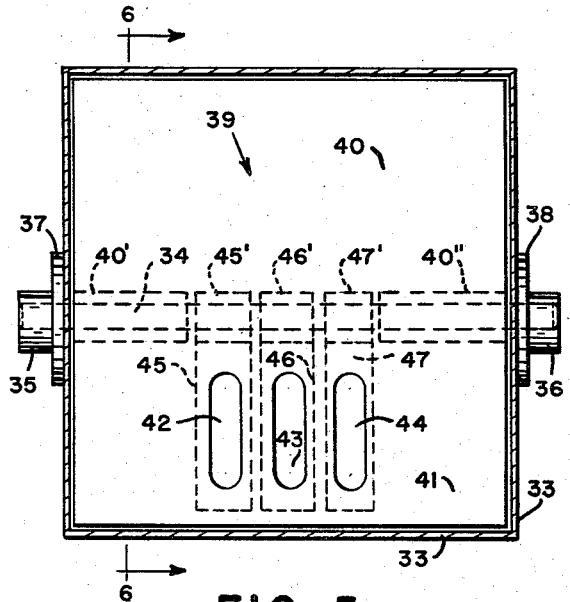
FIG. 5 is a cross-sectional view of a duct including a damper to which another modified form of the principles of the invention has been applied.

Referring to the embodiment of FIGS. 5 and 6, the principles of the invention are shown as applied to a duct 33 having a pivot shaft 34 that is journaled in end bearings 35 and 36 having flanges 37 and 38 fixed to the outside walls of duct 33. A damper 39 having portions 40 and 41 of different area may extend radially in a plane from the shaft 34. In the embodiment disclosed, the area of portion 40 exceeds that of portion 41 with the fluid flow in the direction of the arrow in FIG. 6. The portion 41 may be provided with a plurality of slots or ports 42, 43 and 44, further increasing the effective area differential between portions 40 and 41. Corresponding vanes 45, 46 and 47 may be mounted on shaft 34 for free oscillatible movement thereabout. The vanes 45, 46 and 47 are adapted progressively to seal off the respective slots 42, 43 and 44 when the damper 39 moves from its open position toward a closed postion to reduce the effective differential area between portions 40 and 41.

The vanes 45, 46 and 47 may each include a hub 45', 46' and 47', respectively, of rectangular cross section. The hubs 45', 46' and 47' may be journaled in spaced relation on shaft 34. The damper 40, 41 may be fixed to spaced rectangular hubs 40', 40" also journaled in spaced relation on shaft 34. Separate stops 48, 49 and 50 may be fixed to a stationary support 50'. Each of the stops 48, 49 and 50 is adapted to engage one of the hubs 45', 46' and 47', respectively, and to limit the counterclockwise movement of the corresponding vanes 45, 46 and 47, respectively, a different predetermined amount.

Compression spring 51, 52 and 53 may be fixed to the support 50' and also to the vanes 45, 46 and 47, respectively, urging them in a clockwise direction until their corresponding hubs engage stops 48, 49 and 50.

A spring or weight device 54 may be employed to hold the damper 39 open to a position to pass a predetermined quantity of air past the damper, against the force tending to close the damper due to the portion 40 having a greater effective area than the portion 41.

With the apparatus in the condition shown in FIG. 6, increases in upstream pressure will cause the damper 39 to turn clockwise toward a closed position. As this occurs, successive of the slots 44, 43 and 42 are sealed off, thereby tending to balance the effective areas of the portions 41 and 40 and increasing the resistance to closing of the damper 39. In this way, slamming of the damper 39 closed will be avoided.

Figure 8:
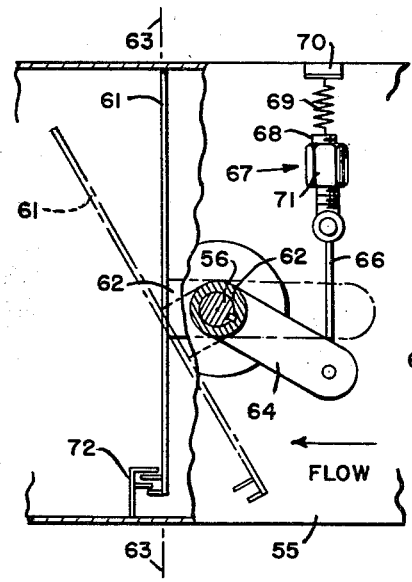
FIG. 8 is a view taken along line 8—8 of FIG. 7.
Figure 7:
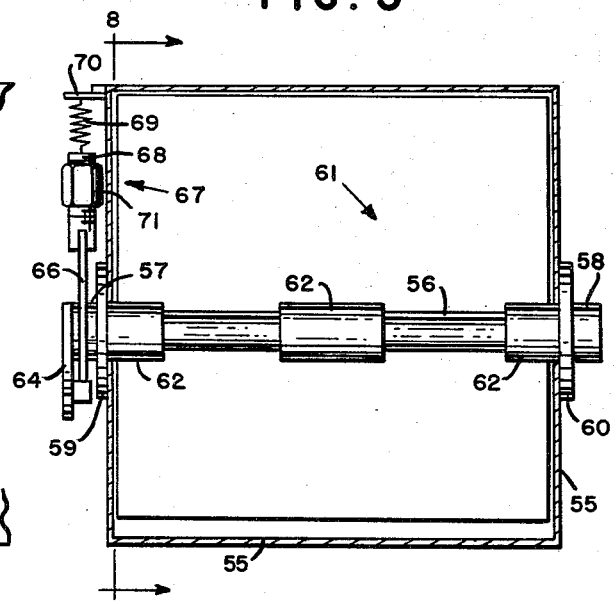
FIG. 7 is a cross-sectional view of a duct including a damper to which still another modified form of the principles of the invention has been applied.

Referring to FIGS. 7 and 8, the principles of the invention are shown as applied to a duct 55 across which a pivot shaft 56 extends and which shaft is journaled in bearings 57 and 58 having flanges 59 and 60 fixed to the outside of the duct 55.

A damper 61 may be provided with bosses 62 through which the shaft 56 extends, and to which bosses the shaft 56 is fixed. The arrangement may be such that the plane 63—63 of the closed position of damper 61 is downstream from the pivot shaft 56. A link 64 may be fixed to shaft 56 on the outside of duct 55 and it forms with bosses 62, a bell crank lever. The end of link 64 opposite that connected to shaft 56 may be connected to one element 66 of a turnbuckle arrangement 67. The opposite element 68 of the turnbuckle 67 may be fixed to a spring or weight device 69 that is supported by a bracket 70 fixed to the outside of duct 55. By turning a nut 71, varying degrees of force can be applied to the link 64, and the nut 71 may be so adjusted that it maintains the damper 61 in a position against the action of the fluid flow tending to close the damper so as to cause a predetermined fluid flow past the damper.

Referring to FIG. 8, it is evident that as the damper 61 moves from a closed position toward an open position, the force moment acting on damper 61 tending to open it decreases more rapidly than the force moment tending to close it. Furthermore, when damper 61 moves from an open position toward a closed position, the force moment tending to resist the closing increases more rapidly than that tending to effect such closing. Accordingly, as the pressure increases upstream, the damper moves clockwise toward the closed position; however, the force moment tending to resist such closing increases more rapidly than the force moment tending to effect such closing. This action, therefore, tends to equalize the force moments as the damper moves toward a closed position, thereby preventing slamming of the damper 61 closed.

In addition, snubbers 72, which are shown in FIG. 8 as being in the form of a labyrinth construction, may be provided in the ducts for cooperation with mating constructions on the dampers for each of the species disclosed to further prevent slamming of the dampers closed.

From the foregoing it is evident that a unique arrangement of a pivotal damper has been provided embodying differential force producing means that vary in response to variations in upstream fluid pressure which automatically produce an effective control of fluid flow past the damper and which variation in effective force producing means operates to prevent slamming shut of the damper.

Figure 10:
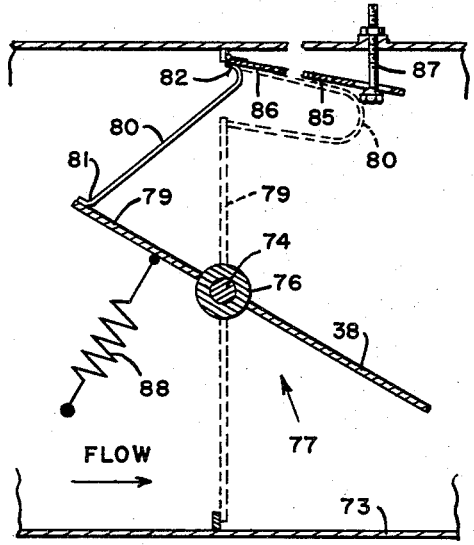
FIG. 10 is a view taken along line 10—10 of FIG. 9.
Figure 9:
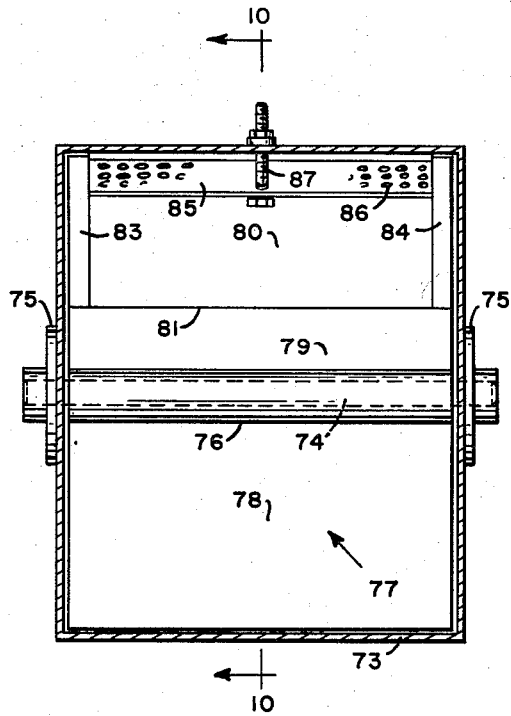
FIG. 9 is a cross-sectional view of a duct including a damper to which still another modified form of the principles of the invention has been applied.

Referring to FIGS. 9 and 10, the principles of the invention have been shown as applied to a duct 73 having a shaft 74 extending transversely thereacross. The shaft 74 may extend through the side walls of the duct 73 and may have discs 75 fixed thereto which in turn may be attached to the outer surface of the duct 73. A sleeve 76 may be journaled on the shaft 74, and a damper 77 may be fixed to the sleeve 76. The damper 77 may include a portion 78 that substantially fills the duct 73 beneath the pivot shaft 74 when the damper is closed, and an upper portion 79 that is substantially shorter than the lower portion. A flexible curtain 80, of less width than that of duct 73, may have its one end 81 attached to the free end of portion 79, and its other end 82 attached to the top wall of duct 73. Referring to FIG. 9, the width of curtain means 80 provides air passage spaces 83 and 84 on each side of it. A motion limiting plate 85 having apertures 86 therein may be hinged to the upper wall of duct 73, and an adjustable connector 87 may be provided for presetting the angular position of the limiting means 85. Curtain 80 is adapted to move into contact with plate 85 and to peel off therefrom as the damper 77 moves between its various positions during use.

Referring to FIG. 10, resilient means 88 may be provided for normally maintaining damper 77 in position to pass a predetermined volume of air. As the upstream pressure increases, the effective area of curtain 80 acting to tend to close damper 77 is great. However, as the damper moves toward closed position and the curtain means contacts the limiting plate 85, the effective area of curtain 80 tending to close damper 77 decreases, since it is the projected area between the two sides of the curtain means 80 as shown in dotted lines in FIG. 10.

Although the various features of the new and improved fluid flow control have been shown and described in detail to fully disclose several embodiments of the invention, it will be evident that numerous changes may be made in such details, and certain features may be used without others without departing from the principles of the invention.

What is claimed is:

1. In a flow control device, a duct; a rotatable pivot shaft within said duct; a uni-planar damper mounted within said duct, and adapted to oscillate between closed and open positions; means for mounting said damper within said duct in fixed relation to, and rotatable with said pivot shaft; means for rotating said pivot shaft while also moving it along a path in a manner to expose a separate differential area of said damper to fluid flowing through said duct for each position of said damper, whereby the slamming of said damper is prevented when upstream pressure of the fluid increases.

2. In a flow control device, a duct; a rotatable pivot shaft within said duct, a uni-planer damper mounted within said duct, and adapted to oscillate between closed and open positions; means for mounting said damper within said duct in fixed relation to, and rotatable with said pivot shaft; means for rotating said pivot shaft while also moving it along a cycloidal path in a manner to expose a separate differential area of said damper to fluid flowing through said duct for each position of said damper whereby slamming of said damper is prevented when upstream pressure of the fluid increases.

3. In a flow control device, a duct; a uni-planar damper mounted within said duct, and adapted to oscillate between a closed and open position when air flows through said duct; a pivot shaft for said damper extending transversely across said duct and located upstream from the plane of said damper when it is in its closed position; boss means on said pivot shaft, said damper being tangentially connected to said boss means; and means for rotating said pivot shaft while also moving said pivot shaft along a line parallel to the plane including said damper when in its closed position as said damper oscillates.

4. In a flow control device, a duct; a uni-planar damper mounted within said duct, and adapted to oscillate between a closed and open position when air flows through said duct; a pivot shaft for said damper extending transversely across said duct and located upstream from the plane of said damper when it is in its closed position; boss means on said pivot shaft, said damper being tangentially connected to said boss means; and rack and pinion means for rotating said pivot shaft while also moving said pivot shaft along a line parallel to the plane including said damper in its closed position when variations in pressure of flowing air within said duct occur.

5. In a flow control device, a duct; a uni-planar damper mounted within said duct, and adapted to oscillate between a closed and open position when air flows through said duct; a rotatable pivot shaft extending transversely across said duct and located upstream from the plane of said damper when it is in its closed position, said damper being fixed to, and rotatable with said pivot shaft; and rack and pinion means between said duct and pivot shaft for effecting the movement of said pivot shaft along a line parallel to the plane including said damper in its closed position when variations in pressure of flowing air within said duct occur.

6. In a flow control device, a duct; a uni-planar damper mounted within said duct, and adapted to oscillate between a closed and open position when air flows through said duct; a rotatable pivot shaft extending transversely across said duct and located upstream from the plane of said damper when it is in its closed position, said damper being fixed to, and rotatable with said pivot shaft; rack and pinion means between said duct and pivot shaft for effecting the movement of said pivot shaft along a line parallel to the plane including said damper in its closed position; and means for normally urging said damper to a position where a predetermined flow of fluid past said damper occurs.

References Cited by the Examiner
UNITED STATES PATENTS

| | | | |
|---|---|---|---|
| 505,238 | 9/93 | Smith | 137—520 XR |
| 571,658 | 11/96 | Graves | 137—499 |
| 1,105,280 | 7/14 | Kurtz | 137—521 |
| 2,263,980 | 11/41 | Carlson | 137—521 |
| 2,310,678 | 2/43 | Crew | 251—250 XR |
| 2,349,719 | 5/44 | Guthrie | 137—514 |

M. CARY NELSON, *Primary Examiner.*

ISADOR WEIL, MARTIN P. SCHWADRON,
*Examiners.*